Patented Feb. 14, 1928.

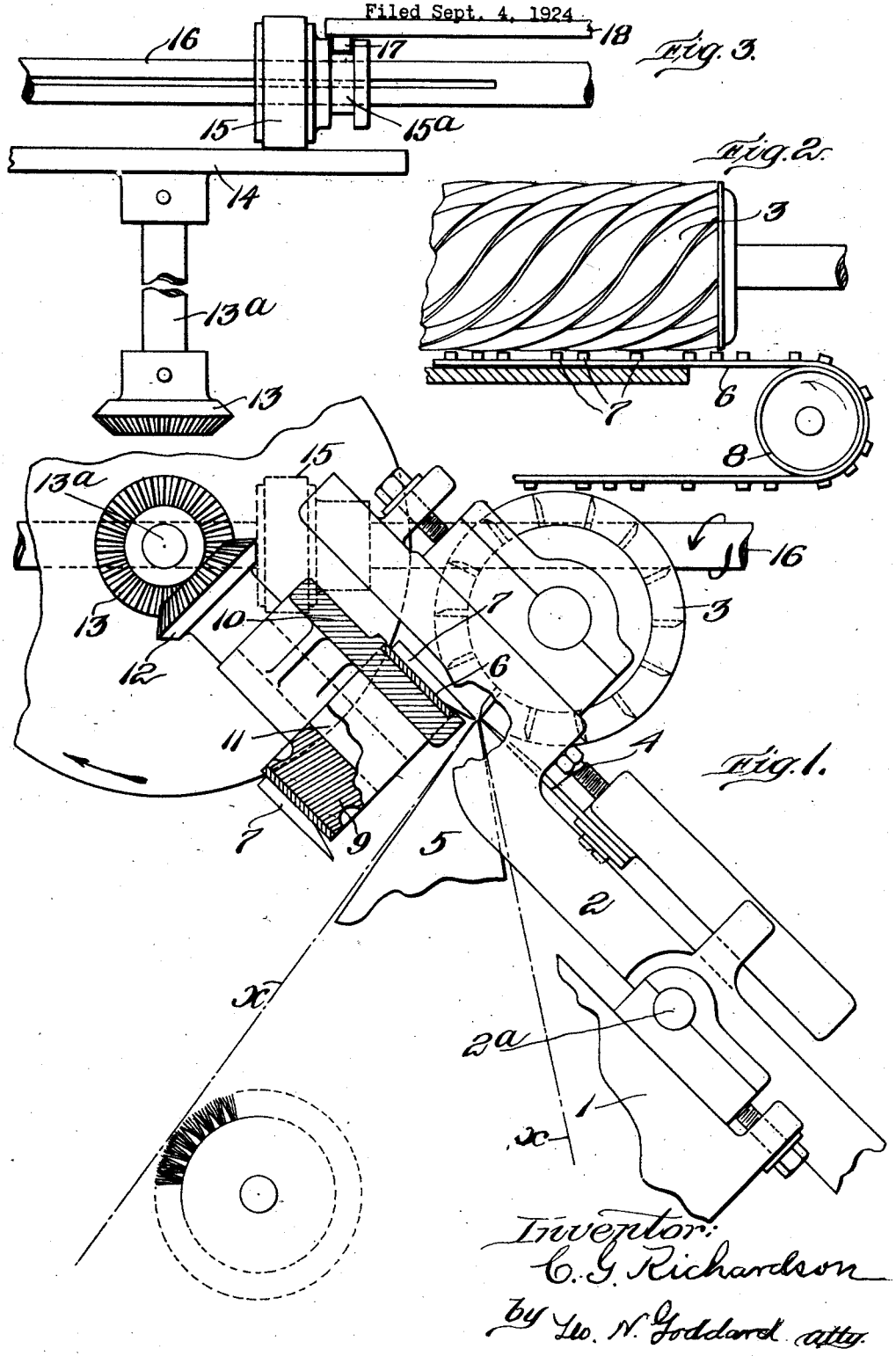

1,659,535

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

PATTERN-SHEARING MACHINE.

Application filed September 4, 1924. Serial No. 735,816.

This invention relates to the art of pattern shearing and embraces improvements in pattern producing mechanism by which a variety of patterns, formed of sheared lines in the nap or pile of the fabric, may be conveniently and rapidly produced.

The invention herein described may be utilized for the shearing of diagonal lines running at any desired angle, either from left to right or from right to left, and the lines of the pattern may be straight or curved, zig-zag or serpentine, according to the feed imparted to the pattern element.

In its general features the invention comprises a pile-protecting element having an interrupted pile-depressing edge that is, an edge formed with gaps to allow the subjacent pile to project up through, the said element being capable of continuous or intermittent travel in either direction across the fabric being sheared in parallelism with the line of shearing maintained between the stationary ledger blade and the revolving fly blade of a cloth shear, the effective edge of the pattern element lying close to and directly opposed to the ledger blade.

While the device herein shown and described as an embodiment of the invention is capable of producing straight sheared lines lengthwise of the cloth, the main object is to produce patterns of a diagonal order.

These and other features of the invention will be explained in the following specification and will be defined in the claims hereto annexed.

In the accompanying drawings is illustrated one form of construction and arrangement embodying the principles of the present invention, in which:

Figure 1 is a side elevation partly in section of that portion of a shearing machine embracing the shearing elements and cloth rest to which my improved pattern shearing element is applied.

Figure 2 is a front view showing the relation of the traveling pattern element to the revolving fly blade of the cloth shear, as viewed in the plane of the belt.

Figure 3 is a plan view illustrating a mode of applying the reversible change speed driving couple for the purpose of varying the sheared patterns produced.

As is well known to those skilled in the art, the ordinary cloth shear for clipping the nap or pile of pile fabrics comprises a cloth rest provided with a clearly defined corner or edge around which the cloth passes to expose the upwardly projecting pile to the action of the shearing elements which comprise a fixed ledger blade and a rotary fly blade. It is to this kind of a shear that my present pattern element or attachment is applied, and only such elements of the cloth-shearing machine itself as are necessary to an understanding of the present invention are illustrated in the drawings.

According to the construction and arrangement shown in Figure 1 of the drawings, the shear head or frame 2 is pivotally mounted on trunnions 2$^a$ in a fixed portion of the frame 1. In the shear blade head 2 is mounted the rotary fly blade 3 and the head also carries a properly adjusted stationary ledger blade 4 which usually stands at substantially a tangential plane to the peripheral path of the fly blades. Normally the blade-carrying head is set to a position to bring the shearing line formed by the contact between the helical blades and the edge of the fixed ledger blade 4 a slight distance away from the angle or edge of the fixed cloth rest 5. Line $x$—$x$ indicates the travel of the cloth over and around the cloth rest, the nap side being outward to expose the nap or pile to the shearing action of the shearing elements 3 and 4 in the usual manner.

So long as the pile is allowed to stand up freely as it passes around the edge of the cloth rest, it is apparent that the revolving helical blades will shear off the outer ends projecting beyond the edge of the ledger blade. If, however, an element is interposed to depress or keep down the ends of the pile so that they do not project beyond the edge of the ledger blade, then obviously no shearing or clipping of the pile can take place.

The pattern element in this case comprises an endless belt or band 6, provided with a pile-depressing edge which is formed at any desired or suitable intervals with gaps or notches to allow the subjacent portions of the pile to project upward in normal manner across the edge of the ledger blade. This endless band with an interrupted or notched edge may be formed in any suitable manner, but I have here shown a belt member 6, to which are attached, at spaced intervals, blade members 7 presenting a thin blade-like edge directly opposite and close to the edge of the ledger blade 4. Normally the edges of these blades travel so close to the ledger blade and so interposed between the cloth rest and the fly blade that the nap is kept depressed from the shearing line so that the underlying portions of the nap engaged by these blades can not be sheared.

The intermediate spaces between the blades form open gaps allowing the subjacent portions of the nap to be clipped off, thereby forming sheared lines in the nap of the cloth.

This blade belt is carried around an idler pulley 8 disposed at one side of the machine, and a driving pulley 9, disposed at the opposite side of the machine, so that the pattern element may be given any desired speed of travel across the fabric parallel to the line of shearing. This arrangement obviously will produce a series of sheared stripes of a width corresponding to the width of the notches or spaces between the blades, said stripes running diagonally across the fabric, the angle of inclination depending upon the ratio of speed of travel of the cloth to the speed of travel of the pattern element. That is, the diagonal stripe is a resultant of the longitudinal feed of the cloth and the transverse travel of the pattern element.

If the pattern element travels across the cloth from right to left, then the diagonal stripes will be inclined in the same direction, while on the other hand, if the pattern element be caused to travel from left to right across the cloth the diagonal stripes will extend in that direction.

Should the speed of travel of the pattern element be progressively accelerated while a piece of cloth is being run through the machine, the resultant will be a curved diagonal instead of a straight diagonal. If the pattern element be alternately moved to and fro there will be produced either zigzag or serpentine lines, according to the travel imparted to the pattern element.

I will now describe the further details of construction by which the above described and other variations in the pattern may be obtained.

The driving pulley 9 is mounted on a transmission shaft 11 which carries a bevel gear 12, intermeshing with a bevel gear 13 which is combined with the disk 14 by means of a short connecting shaft 13$^a$. Parallel with the face of the disk 14 is arranged a driving shaft 16 driven from any suitable pulley connection, not shown, on which is splined a slidable friction wheel 15 having a friction periphery and positioned so as to closely engage the face of the disk 14. The friction pulley 15 is splined to the shaft 16 to permit sliding movement toward and away from and across the axis of the transmission shaft 13$^a$, and a suitable shipper rod 18, provided with a fork or clevis engaging the groove 15$^a$ in the hub of the friction pulley effects the desired shifting of the friction driving pulley toward or away from the center of the transmission disk 14 to vary or neutralize the speed of rotation imparted to the shaft 13$^a$. This action takes place whether the position or shifting of the friction pulley 15 is controlled through the shipper by hand or by automatic controlling mechanism.

Turning now to Figure 1, and assuming that the driving shaft 16 is rotating in the direction of the arrow, it will be seen that such rotation turns the disk 14 in a clockwise direction at a medium rate of speed and that such rotation of the disk, through the miter gears and connecting shaft, will cause the effective or working operation of the pattern element to travel away from the observer, thus producing diagonal stripes running from right to left across the cloth as one views it from in front.

Shifting the driving pulley 15 nearer to the center of the transmission disk 14 operates to increase the speed of travel of the band 6, thereby tending to flatten out the diagonals transversely. The shifting of the pulley toward the periphery of the disk operates to lessen the angle of the diagonal stripes to the longitudinal axis of the cloth. Should the driving pulley 15 be shifted to the neutral or central position there will be no rotation of the disk, and in that case stripes running lengthwise of the cloth will be produced. When the driving pulley is shifted to the opposite side of the center the stripes will be inclined toward the right instead of from the right, the angle depending upon the rate of speed imparted to the endless band.

To prevent sagging of the pile-depressing edge of the pattern element I prefer to provide, between the two pulleys 8 and 9, an intermediate supporting guide plate or ledge 10 which acts to maintain the interrupted edge in alinement with the edge of the ledger blade and as close as practicable thereto in order to prevent the pile threads from projecting upward between the ledger blade and the effective edge of the pattern element.

The belt is made long enough to extend beyond the side edges of any cloth that is to be sheared in the machine and in a plane that is substantially tangent to the periphery of the fly blade.

While I have shown a specific form of reversible change speed driving mechanism it will be understood that any suitable or well known form of speed change reversible drive mechanism may be used to impart the desired movement to the pattern belt.

What I claim is:

1. In a pattern shearing machine, the combination with a cloth-supporting rest and its associated shear blades, of a pattern element provided with an interrupted pile-depressing edge mounted to travel continuously in one direction across the fabric on the opposite side of the fabric from the cloth rest in juxtaposition to and parallel with the line of shearing in order to produce a sheared pattern of the diagonal order, substantially as described.

2. In a pattern shearing machine, the combination with a cloth rest and coordinated shearing elements, of a pattern element embracing an endless belt arranged on the same side of the fabric with the shearing elements and having an interrupted edge positioned in close proximity to the shearing line of said blade elements, and means for causing said belt to travel across the fabric being sheared to produce sheared lines of a diagonal order in the pile of the fabric being sheared, substantially as described.

3. In a pattern shearing machine, the combination with a cloth-supporting rest and its associated shearing blades, a pile depressing element embracing an endless belt having one edge arranged to depress the pile at the shearing line toward the cloth rest, said edge being provided with gaps suitably spaced apart to allow subtending portions of the pile to project through them to be clipped by the shear blades, and means for causing said belt to travel lengthwise of the cloth rest to produce sheared lines diagonally of the fabric, substantially as described.

4. In a pattern-shearing machine, the combination with a cloth-supporting rest and its associated shearing blades, of a pile-depressing element mounted to travel over the pile of the fabric close to the line of shearing, and having its pile-depressing edge formed with gaps to permit subjacent portions of the pile to protrude, driving means for causing said pile-depressing element to travel across the fabric being sheared, said driving means embracing speed-change mechanism by which the operator may vary the ratio of travel of said pile-depressing element to the travel of the cloth in order to vary the angle of the sheared lines produced, substantially as described.

5. In a pattern shearing machine, the combination with a cloth supporting rest and its associated shearing blades, of a pile-depressing element mounted to travel continuously in one direction over the pile of the fabric close to the line of shearing and having a pile-depressing edge formed with gaps to permit subjacent portions of the pile to protrude, driving means for causing said pile-depressing element to travel across the fabric being sheared, said driving means being reversible by the operator to cause continuous travel in the reverse direction and thereby produce diagonal sheared lines of reverse inclination, substantially as described.

6. In a pattern shearing machine, the combination with a cloth supporting rest and its associated shearing blades, of a pile-depressing element mounted to travel continuously in one direction over the pile of the fabric close to the line of shearing and having a pile-depressing edge formed with gaps to permit subjacent portions of the pile to protrude, driving means for causing said pile-depressing element to travel across the fabric being sheared said driving means being reversible and of variable speed to produce different sheared patterns in the pile of the cloth, substantially as described.

7. A pattern element for a cloth shearing machine embracing in its construction an endless belt provided with thin edged spaced blades projecting from one side, adapted to be mounted transversely of the cloth shear with the thin edges of the blades located to travel parallel with and in close opposition to the edge of the ledger blade of the cloth shear, substantially as described.

8. A pattern element for a cloth shearing machine embracing an endless belt provided along one side with an interrupted pile-depressing edge adapted to be arranged to interpose its pile-depressing edge between the cloth passing over the cloth rest of the machine and the rotary fly blade thereof, substantially as described.

9. A pattern element for a cloth shearing machine comprising an endless belt provided with an interrupted pile-depressing edge arranged substantially tangent to the rotary fly blade of the shearing machine, and reversible driving means for causing said belt to travel across the fabric being sheared between the cloth-supporting edge of the cloth rest and said fly blade, substantially as described.

In witness whereof, I have subscribed the above specification.

CHARLES G. RICHARDSON.